Patented Mar. 6, 1951

2,544,294

UNITED STATES PATENT OFFICE 2,544,294

3-THIENYL SULFIDES

John W. Brooks, Wenonah, and Alexander N. Sachanen, Woodbury, N. J., assignors to Socony-Vacuum Oil Company, Incorporated, a corporation of New York No Drawing. Original application January 28, 1948, Serial No. 4,928. Divided and this application January 22, 1949, Serial No. 72,265

6 Claims. (Cl. 260—329)

This invention relates to a group of new chemical compounds having the general formula:

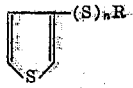

where R is a thienyl group or a long chain saturated alkyl group and n is a whole number ranging from 2 to 5, inclusive; more particularly, the present invention is directed to the improvement of various mineral oil fractions susceptible to the deleterious effects of oxidation by incorporation therein of a minor proportion of one or more of the aforesaid compounds in an amount sufficient to stabilize the oil against oxidation.

As is well known to those familiar with the art, substantially all of the numerous fractions obtained from mineral oils and refined for their various uses are susceptible to oxidation. The susceptibility of an oil fraction to oxidation and the manner in which oxidation manifests itself within the oil varies with the type and degree of refinement to which the oil has been subjected and with the conditions under which it is used or tested; that is, the products formed in an oil fraction as a result of oxidation and the degree to which they are formed depend on the extent to which the various unstable constituents or constituents which may act as oxidation catalysts have been removed by refining operations and also upon the conditions of use.

The present invention is predicated upon the discovery that a new group of chemical compounds, which are thienyl sulfides, greatly improves the oxidation characteristics of mineral oil fractions by the incorporation therein of minor proportions of these compounds. It has been found that by the addition of a thienyl sulfide, of the type hereinafter defined, to a viscous mineral oil fraction, the development of undesirable products and properties, such as acid, sludge, discoloration, and corrosiveness toward alloy-bearing metals, normally encountered under conditions of use, has been substantially inhibited.

The thienyl sulfide compounds of this invention may be designated by the general formula:

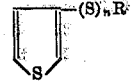

where R represents a thienyl group or a long chain saturated alkyl group having a chain length of between about 4 and about 24 carbon atoms and n is a whole number ranging from 2 to 5, inclusive.

Thus, the above compounds include di-3-thienyl disulfide, di-3-thienyl trisulfide, di-3-thienyl tetrasulfide, di-3-thienyl pentasulfide, 3-thienyl dodecyl trisulfide, 3-thienyl dodecyl tetrasulfide, 3-thienyl tetradecyl trisulfide, 3-thienyl tetradecyl tetrasulfide, 3-thienyl stearyl trisulfide, 3-thienyl octyl tetrasulfide, 3-thienyl hexyl trisulfide, and the like. The above list, of course, is not to be construed as limiting, since numerous other compounds which will occur to those familiar with the art, and falling within the scope of the above general formula, are contemplated by the present invention.

The compounds of this invention as set forth above may be prepared by various methods, depending upon the particular compound desired. Thus, the diethienyl disulfides are suitably prepared by the reaction of 2 moles of 3-thiophenethiol with iodine in the presence of aqueous alkali. Similarly, dithienyl disulfide may be prepared by the condensation of 2 moles of a metal salt of 3-thiophenethiol; e. g., lead salt, in the presence of iodine. Di-3-thienyl trisulfide may be prepared by the reaction of sulfur dichloride with 3-thiophenethiol. The reaction of sulfur chloride with 3-thiophenethiol is generally used for the preparation of di-3-thienyl tetrasulfide. If the reaction is carried out in the presence of free sulfur in a carbon disulfide solution, a di-3-thienyl pentasulfide is obtained. The above-mentioned dithienyl disulfides generally react readily with sulfur or metal polysulfides and may be converted to the trisulfides, tetrasulfides, or pentasulfides. Under similar conditions, dithienyl trisulfides and tetrasulfides may be converted to pentasulfides. In like manner, the thienyl alkyl polysulfides may be obtained by reacting an alkyl mercaptan with 3-thiophenethiol. The reactant of 3-thiophenethiol may be prepared by any feasible procedure such as that described in Chemical Industries 60, 593-5, 620 (1947).

A synthesis of the compounds of this invention may be more readily understood by reference to the following examples, which are given by way of example and not intended to be a limitation on the scope of the invention.

EXAMPLE I

*Preparation of di-3-thienyl disulfide*

Two hundred ninety grams of 3-thiophenethiol were dissolved in 800 cc. of benzene. To this solution was added an aqueous solution of 330 grams (1.3 moles) of iodine dissolved in 1500 cc. of water containing 500 grams of potassium iodide. The two solutions were thoroughly mixed by agitation. The resulting reaction mixture was then washed with a sodium thiosulfate solution in order to convert any free iodine into sodium iodide. After washing with sodium hydroxide solution to remove any unreacted thiophenethiol, the benzene solution was dried over magnesium sulfate. The solution was then topped at atmospheric pressure to remove the benzene and finally to a pot temperature of 70° C. at one millimeter pressure. Di-3-thienyl disulfide was obtained in 84 per cent yield and was found to have a sulfur content of 55.7 per cent, the theoretical sulfur content being 55.67 per cent.

EXAMPLE II

*Preparation of di-3-thienyl trisulfide*

Three hundred forty-eight grams (3 moles) of 3-thiophenethiol were placed in a flask and 206 grams (2 moles) of sulfur dichloride were added at such a rate that the temperature was maintained at about 50° C. After the addition was completed, the mixture was heated to 60° C. for a period of 4 hours. The resulting reaction product was washed with aqueous sodium hydroxide solution, then water-washed, and finally dried over anhydrous magnesium sulfate. The product was treated with decolorizing clay and thereafter topped to 50° C. under a reduced pressure of one millimeter. Di-3-thienyl trisulfide was obtained in 71.5 per cent yield (based on the weight of sulfur dichloride). The sulfur content of the product was 62.55 per cent, the theoretical sulfur content being 61.08 per cent.

EXAMPLE III

*Preparation of di-3-thienyl tetrasulfide*

One hundred one grams (¾ mole) of sulfur chloride were slowly added to a suspension of 231 grams (1.5 moles) of 3-thienyl potassium mercaptide in dioxane. The suspension was cooled by ice water during the aforesaid addition so that the temperature was maintained below 30° C. The reaction mixture was then washed twice with water, dissolved in ethyl ether and dried over anhydrous magnesium sulfate. The product so obtained was topped to a pot temperature of 50° C. under a reduced pressure of one millimeter. Di-3-thienyl tetrasulfide was obtained in 93.7 per cent yield. The sulfur content of the product was 63.5 per cent sulfur, the theoretical sulfur content being 65.3 per cent.

EXAMPLE IV

*Preparation of 3-thienyl, n-dodecyl trisulfide*

One hundred twenty-eight grams (1.1 moles) of 3-thiophenethiol and 228 grams (1.1 moles) of n-dodecyl mercaptan were placed in a flask and 103 grams (1 mole) of sulfur dichloride were added at such a rate that the temperature was maintained at about 50° C. After the addition was completed, the reaction mixture was agitated at a temperature of about 60° C. for a period of 4 hours. The resulting reaction mixture was washed with aqueous sodium hydroxide solution, water-washed, and dried over anhydrous calcium sulfate. The product so obtained was topped to a temperature of 100° C. at a pressure of one millimeter to obtain an 88 per cent yield (based on the weight of sulfur dichloride) of 3-thienyl, n-dodecyl trisulfide. The sulfur content of the product was 36.8 per cent, the theoretical sulfur content being 36.78 per cent.

EXAMPLE V

*Preparation of 3-thienyl, n-dodecyl tetrasulfide*

One hundred twenty-eight grams (1.1 moles) of 3-thiophenethiol and 222 grams (1.1 moles) of n-dodecyl mercaptan were placed in a flask. One hundred thirty-five grams (1 mole) of sulfur chloride were added at such a rate that the temperature was maintained at about 50° C. The reaction mixture was then heated for a period of 4 hours at a temperature of 60° C. and thereafter was washed with aqueous sodium hydroxide solution, water-washed, and dried over anhydrous calcium sulfate. The resulting product was treated with a decolorizing clay and was then topped to 100° C. at a pressure of one millimeter. 3-thienyl, n-dodecyl tetrasulfide was obtained in an 88 per cent yield (based on the weight of sulfur chloride). The sulfur content of the product was 40.7 per cent, the theoretical sulfur content being 42.11 per cent.

The above described compounds of this invention have been found to be particularly valuable as additives in the stabilization of petroleum oil fractions in inhibiting the development of those undesirable products and properties such as acid, sludge, discoloration, and corrosiveness toward alloy-bearing metals normally encountered under conditions of use. Thus, it is well known that motor oils, especially those refined by certain solvent extraction methods, tend to oxidize when subjected to high temperatures and to form products that are corrosive to metal bearings. This corrosive action may be quite severe with certain bearings, such as those having the corrosion susceptibility of cadmium-silver alloys, and may cause their failure within a comparatively short time. The following test was used to determine the corrosive action of a motor oil on an automobile connecting rod bearing.

The oil used consisted of Pennsylvania neutral and residual stocks separately refined by means of Chlorex and then blended to give a SAE 20 motor oil with a specific gravity of 0.872, a flash point of 435° F., and a Saybolt Universal viscosity of 318 seconds at 100° F. The oil was tested by adding a section of a bearing containing a cadmium-silver alloy surface and weighing about 6 grams, and heating it to 175° C. for 22 hours while a stream of air was bubbled against the surface of the bearing. The loss in weight of the bearing during this treatment measures the amount of corrosion that has taken place. A sample of the oil containing a stabilizing compound of this invention was run at the same time as a sample of the straight oil, and the loss in weight of the bearing section in the inhibited oil can thus be compared directly with the loss in uninhibited oil. The results obtained in this test employing minor proportions of the above described compounds as inhibitors are set forth in the following table:

| Compound Added | Concentration in Per Cent | Mg. Loss in Weight |
|---|---|---|
| None | 0 | 20 |
| Di-3-thienyl disulfide | 0.25 | 6 |
| Di-3-thienyl trisulfide | 0.25 | 1 |
| Di-3-thienyl tetrasulfide | 0.25 | 0 |
| n-dodecyl, 3-thienyl trisulfide | 0.25 | 2 |
|  | 0.5 | 0 |
| n-dodecyl, 3-thienyl tetrasulfide | 0.25 | 0 |
|  | 0.5 | 0 |

From the foregoing test results, it will be evident that minor proportions of the compounds contemplated by this invention are highly effective in stabilizing viscous petroleum oil fractions against the normal deteriorating effects of oxidation.

The compounds have further been found to be particularly valuable as additives in the stabilization of petroleum oils such as transformer oils and technical white oils which are of a highly refined character and substantially free from unsaturated hydrocarbons and resinous compounds. Oils of this type are normally made by refining petroleum distillates of the requisite viscosity by treatment with large quantities of sulfuric acid, including fuming sulfuric acid, followed by neutralization and clay filtration or redistillation. Insofar as the present invention is concerned, however, the method by which the highly refined character is imparted to the oils is unimportant.

The highly refined viscous petroleum oils, although generally stable against oxidation at atmospheric temperatures, tend to absorb atmospheric oxygen when heated, particularly when in contact with catalytic metals such as copper. The result of such oxidation is the production of acid compounds soluble in the oils. The oils thereby become unsuitable for their intended uses and must be purified or replaced.

The effectiveness of the compounds of this invention in stabilizing highly refined mineral oils against the deleterious effects of oxidation may be evaluated not only by actual use of the stabilized oils in transformers and machinery, but also by a laboratory test commonly known as "German Tar Test," which has been found to give results comparable in degree with the results in actual use. In accordance with this method, a sample of 150 grams of the oil is maintained at a temperature of 120° C. and oxygen gas is bubbled through it slowly for 70 hours at a rate of 2 liters per hour. The sample is then titrated with alcoholic potash and the neutralization of the oil thus determined. The neutralization number varies directly with the susceptibility of the oil to acid formation under the conditions of the test.

In the test specifically described herein, the base oil used was a highly refined oil which had been prepared by treating a coastal distillate with 40 pounds of 98 per cent sulfuric acid and 180 pounds of 103 per cent oleum per barrel (400 pounds) of oil, followed by a clay percolation.

It had a specific gravity of 0.871, a flash point of 310° F. and a Saybolt Universal viscosity of 69 seconds at 100° F. Such an oil containing no additive, when subjected to the aforementioned test, was readily susceptible to oxidation and developed a neutralization number of about 18. The following data indicate that the compounds of this invention are effective in inhibiting the development of acidity in a mineral oil when the same is subjected to oxidation conditions, as evidenced by the comparatively low neutralization number of such oils at the completion of the above test. In each of the oils tested, 0.1 per cent by weight of a compound of this invention was incorporated therein.

| Compound Added | Neutralization Number |
|---|---|
| None | 18 |
| Di-3-thienyl disulfide | 0.04 |
| Di-3-thienyl trisulfide | 0.02 |
| Di-3-thienyl tetrasulfide | 0.02 |
| n-dodecyl, 3-thienyl trisulfide | 0.02 |
| n-dodecyl, 3-thienyl tetrasulfide | 0.02 |

It will thus be evident that the compounds of this invention are extremely effective agents in inhibiting the development of acidity in highly refined petroleum oils when the same are subjected to oxidation conditions.

The quantity of additive employed as a stabilizer to inhibit the undesirable effects of oxidation in the oil may be varied, depending upon the character of the oil and the severity of the conditions to which it is exposed. The dithienyl sulfides of this invention are generally less than one per cent soluble in oil. The thienyl alkyl sulfides of this invention are appreciably more soluble in oil, the solubility thereof increasing as the carbon chain length of the alkyl group of the compound increases. Thus, both the n-dodecyl, 3-thienyl trisulfide and the n-dodecyl, 3-thienyl tetrasulfide described above are more than 10 per cent soluble in oil. Ordinarily, the compositions of this invention will be added to mineral oil fractions in an amount ranging from about 0.1 to about 5 per cent but may be added in amounts up to about 10 per cent by weight in some instances. Generally, the dithienyl sulfides will not be added in amounts greater than about one per cent, due to the aforementioned solubility limitations. However, since even very minute amounts of the dithienyl sulfides have been found to be effective in stabilizing petroleum oil fractions against the undesirable effects of oxidation, this limitation in oil solubility is relatively unimportant insofar as the present invention is concerned.

It is to be understood that the examples and procedures described hereinabove are illustrative only and are not to be construed as limiting the scope of this invention thereto. Thus, in addition to the specific compounds set forth herein, other thienyl sulfides falling within the scope of the above discussed general formula are within the purview of the present invention.

This application is a division of co-pending application Serial No. 4,928, filed January 28, 1948, now Patent 2,534,223.

We claim:
1. As a new composition of matter, a compound having the general formula:

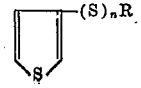

where R is a paraffinic hydrocarbon group having a chain length of from 4 to 24 carbon atoms and $n$ is a whole number ranging from 2 to 5, inclusive.

2. As a new composition of matter, di-3-thienyl trisulfide.

3. As a new composition of matter, di-3-thienyl tetrasulfide.

4. As a new composition of matter, 3-thienyl, n-dodecyl trisulfide.

5. As a new composition of matter, 3-thienyl, n-dodecyl tetrasulfide.

6. As a new composition of matter, a thienyl sulfide selected from the group consisting of di-3-thienyl trisulfide, di-3-thienyl tetrasulfide, and a compound having the general formula:

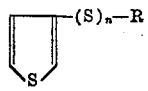

where R is a saturated alkyl group having a carbon chain of between 4 and 24 carbon atoms and $n$ is a whole number ranging from 2 to 5, inclusive.

JOHN W. BROOKS.
ALEXANDER N. SACHANEN.

REFERENCES CITED

The following references are of record in the file of this patent:

UNITED STATES PATENTS

| Number | Name | Date |
|---|---|---|
| 2,110,281 | Adams | Mar. 8, 1938 |
| 2,160,293 | Shoemaker | May 30, 1939 |
| 2,480,831 | Brooks | Sept. 6, 1949 |
| 2,480,832 | Brooks | Sept. 6, 1949 |

OTHER REFERENCES

Caesar: Ind. Eng. Chem. 40, 922 (1948).

Beilstein's Handbuch der Organischen Chemie, ed. 4, vol. 17, page 111 (1933).